United States Patent [19]

Breant et al.

[11] 4,180,859

[45] Dec. 25, 1979

[54] SYSTEM FOR MEASURING THE SPEED OF ROTATION OF A SYNCHRO BY MEANS OF A SAMPLING TECHNIQUE

[75] Inventors: Pierre L. V. Bréant, Clamart; Alain C. Fresnel, Plaisir, both of France

[73] Assignee: U.S. Philips Corporation, New York, N.Y.

[21] Appl. No.: 898,471

[22] Filed: Apr. 20, 1978

[30] Foreign Application Priority Data

Apr. 20, 1977 [FR] France .................................. 77 11874

[51] Int. Cl.² .......................................... G06F 15/20
[52] U.S. Cl. ................................... 364/565; 364/433; 364/817
[58] Field of Search .............. 364/565, 559, 550, 556, 364/721, 433, 817; 318/654; 324/173, 78, 83 Q

[56] References Cited

U.S. PATENT DOCUMENTS

| | | | |
|---|---|---|---|
| 3,629,705 | 12/1971 | Walters | 364/556 X |
| 3,720,866 | 3/1973 | Avellar et al. | 364/559 X |
| 4,021,658 | 5/1977 | Rhodes | 364/817 X |
| 4,056,287 | 11/1977 | Gudat | 364/565 X |
| 4,125,295 | 11/1978 | Ruhnau et al. | 364/565 X |

Primary Examiner—Edward J. Wise
Attorney, Agent, or Firm—Thomas A. Briody; Edward J. Connors, Jr.; James J. Cannon, Jr.

[57] ABSTRACT

By combining three single-phase output voltages of a synchro, signals are obtained which are proportional to the sine and the cosine of the angle of rotation of the synchro shaft. Said signals are sampled at predetermined instants by switching means controlled by a clock voltage, and are applied to computing means which form a signal representative of the speed of rotation of the shaft of the synchro and of a change in the altitude at which an aircraft flies.

9 Claims, 3 Drawing Figures

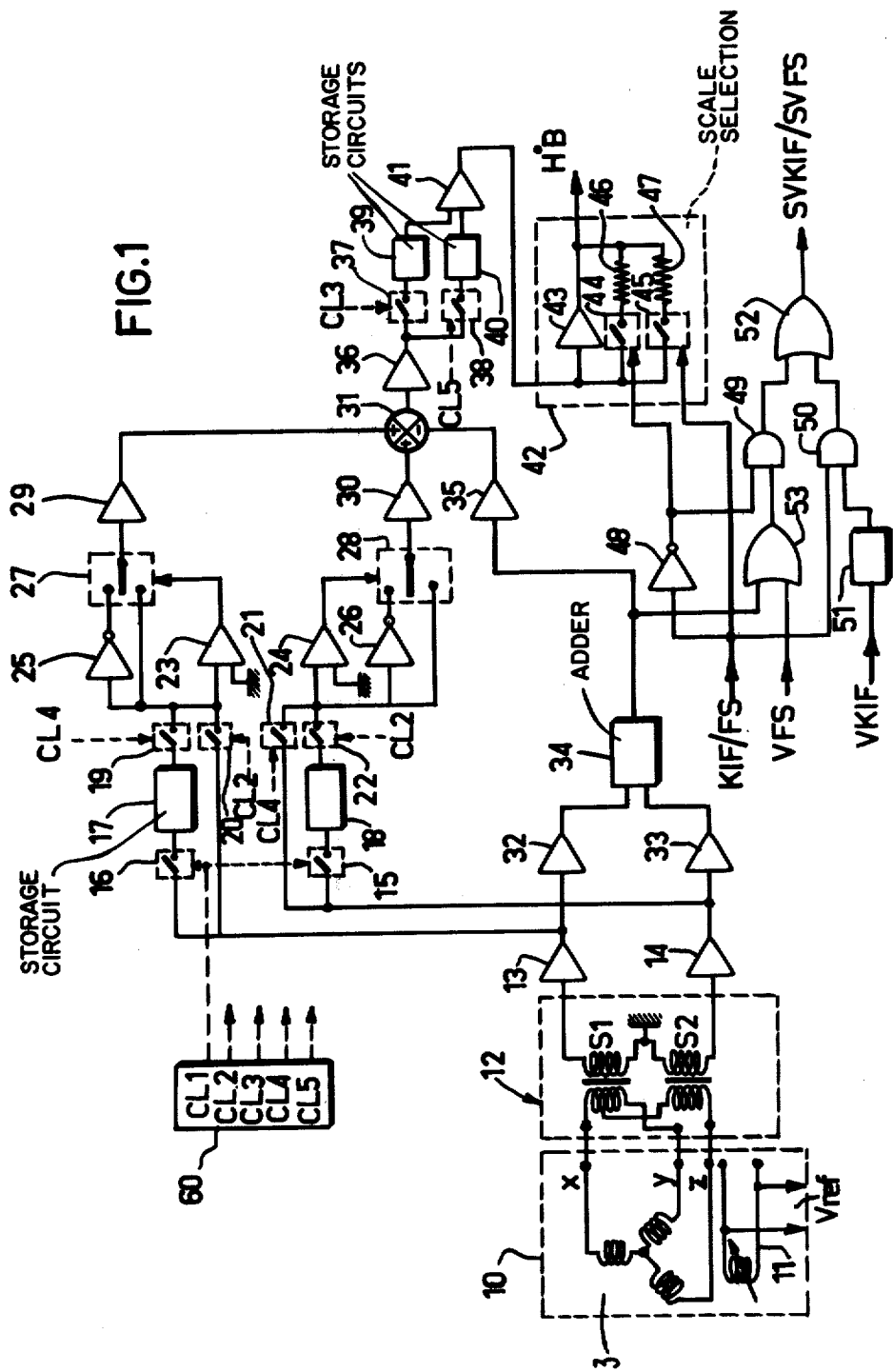

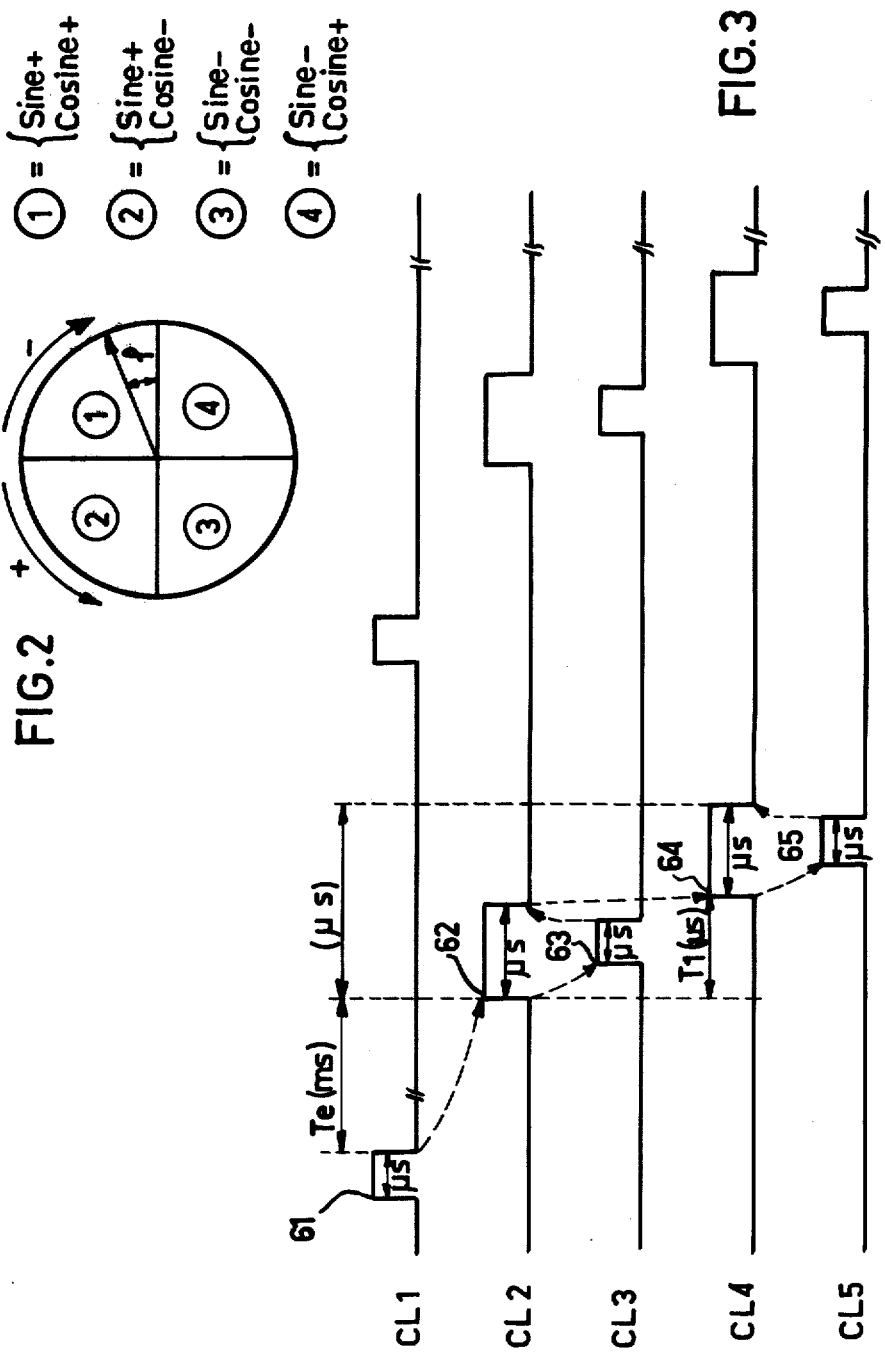

SYSTEM FOR MEASURING THE SPEED OF ROTATION OF A SYNCHRO BY MEANS OF A SAMPLING TECHNIQUE

BACKGROUND OF THE INVENTION

1. Field of the Invention

This invention relates to a system for generating a signal which is representative of the speed of rotation of a synchro while using a first digital signal which is proportional to the sine of the angle of rotation of the shaft of the synchro, and a second digital signal which is proportional to the cosine of said angle.

2. Description of the Prior Art

The signals which correspond to the speed of rotation of the synchro are used in many fields of application, particularly for aircraft which are not provided with a device for indicating their vertical speed. In this case signals are utilized originating from a synchro (driven by a barometric altimeter) the speed of rotation of which is proportional to the vertical speed $H_B$ of the aircraft.

In a known system an analog method is used for deriving the output voltage for generating the speed signal, which causes problems as regards with respect to the sensitivity, the phase distortion, the harmonic distortion of the output noise and the excitation voltage of the synchro.

To avoid the difficulties encountered when generating a signal which is equal to the derivative of an analog signal, it is possible to use the digital sine and cosine signals for calculating the tangent of the angle of rotation of the shaft of the synchro and the derivative of the tangent. As the tangential function is only linear for small angles it is impossible to approach this derivative by means of a first term of a series expansion but several terms must be used, which requires a complicated circuit.

SUMMARY OF THE INVENTION

The invention is characterized in that the system according to the invention comprises means for a first sampling of said sine signal, means for a first sampling of said cosine signal, means for a second sampling of said sine signal after a predetermined time after the first sampling of the sine signal has elapsed, means for a second sampling of said cosine signal after a predetermined time after the first sampling of the cosine signal has elapsed, means for multiplying said second sampled sine signal by said sampled first cosine signal for forming a first product, means for multiplying said sampled first sine signal by said sampled second cosine signal for forming a second product, means for squaring said sine and cosine signals, means for adding said squared sine and cosine signals for forming a first sum, means for dividing said first product by said first sum for forming a first quotient, means for dividing said second product by said first sum for forming a second quotient, and, finally, means for subtracting said second quotient from said first quotient for producing in that manner a signal which is representative of the speed of rotation of the synchronous machine.

The advantages of the system according to the invention will be explained with reference to a special embodiment of the system. The basic principle of the invention is as follows:

The variation $\Delta\phi$ of the angle of rotation of the shaft of the synchro is given by the formula:

$$\sin(\Delta\phi) = \sin\phi\{(T + Te) - (T)\}$$
$$= \sin\phi(T + Te)\cos\phi(T) - \sin\phi(T)\cos\phi(T + Te);$$

where T denotes the first instant at which the generated sine and cosine signals are sampled for the first time, $T+Te$ the second instant at which said sine and cosine signals are sampled for the second time, while $\Delta\phi$ denotes the change in the angle of rotation of the shaft of the synchro between said first sampling instant and said second sampling instant.

The sine and cosine signals generated by the synchro are applied to a transformer whose transformation ratio is denoted by K, so that the voltages at the terminals of the secondary windings S1 and S2 of said transformer have the following values:

$$E_{s1} = K \cdot \sin\phi \cdot \cos\omega t,$$

$$E_{s2} = K \cdot \cos\phi \cdot \cos\omega t.$$

At the sampling instants T and $(T+Te)$ the voltage values of the envelopes of the expressions $K\sin\phi\cos\omega t$ and $K\cos\phi\cos\omega t$ are given by the formula:

$$E_{s1} = K \cdot \sin\phi,$$

$$E_{s2} = K \cdot \cos\phi.$$

The component $\cos\omega t$ represents the instantaneous amplitude of the modulated voltage, that is to say of the excitation voltage of the synchro.

$\sin\Delta\phi$ expressed in the voltage at the secondary side of the transformer is as follows:

$$\sin(\Delta\phi) = K^2\{\sin\phi(T+Te)\cos\phi(T) - \sin\phi(T)\cos\phi(T+Te)\}.$$

The values $\sin(\Delta\phi)$ depends on the transformation ratio K which, in its turn, depends on the excitation voltage of the synchro. To eliminate this noise source use is made of the relation between the trigonometrical functions:

$$\sin^2\phi(t) + \cos^2\phi(t) = 1, \text{ so } K^2\{\sin^2\phi(t) + \cos^2\phi(t)\} = K^2.$$

The generated sine and cosine signals are demodulated, squared and added to obtain the expression:

$$K^2[\sin^2\phi(t) + \cos^2\phi(t)],$$

which is thereafter used for dividing the value $\sin(\Delta\phi)$:

$$\sin(\Delta\phi):$$
$$= K^2 \frac{\{\sin\phi(T + Te)\cos\phi(T) - \sin\phi(T)\cos\phi(T + Te)\}}{K^2\{\sin^2\phi(t) + \cos^2\phi(t)\}}$$
$$= \sin\phi(T + Te)\cos\phi(T) - \sin\phi(T)\cos\phi(T + Te).$$

So the value $\sin(\Delta\phi)$ only depends on the time interval $\Delta t$ between the first and second sampling instants T and $(T+Te)$. The shorter time interval $\Delta t$, the smaller is the measured angle $\Delta\phi$, that is to say the variations in the speed of rotation of the synchro can be distinguished more properly. Owing to the implementation of the system the first and second signal samples of the generated sine and cosine signals are not taken simultaneously at the instants T and (T+Te).

Actually, the first sine signal is sampled at the instant T while the first cosine signal is sampled at the instant (T+T₁), while the sine and cosine signals are sampled for the second time at the instants (T+Te) and (T+Te+T₁), respectively. In practice this method results in a negligible error because the ratio between $Te = (T+Te) - T$ and $T_1 = (T+T_1) - T$ is usually very large. Of course the instants Te and T₁ can be varied, if circumstances require so, by means of the central clock which controls the synchronization between the various switching functions. This will be described in greater detail in the extensive descriptions.

For small values of Te, the value of sin $(\Delta\phi) \approx \Delta\phi$, $\Delta\phi$ is proportional to the speed of rotation of the synchro.

BRIEF DESCRIPTION OF THE DRAWINGS

The invention will be further explained with reference to a drawing in which:

FIG. 1 shows the circuit diagram of a system for generating a signal which is representative of the speed of rotation of the synchro, said speed of rotation corresponding to the speed variations of the barometrical height $H_B$ used in an aircraft, FIG. 2 is a table showing all possible combinations of the signs of the sine and cosine signals, FIG. 3 is a time diagram of the signals supplied by a central clock and which are indispensable for synchronizing the controls of the various switching functions.

DESCRIPTION OF THE PREFERRED EMBODIMENT

In FIG. 1 the synchro 3 supplies three monophase output voltages X, Y and Z. The reference or excitation voltage 11 is a 26 Volts, 400 Hz a.c. voltage, indicated by V in FIG. 1. A combining of the voltages at the output terminals X, Y and Z of the synchro will result in the generation of sine and cosine signals which are proportional to the angle of rotation $\phi$ of the shaft of the synchro so that:

$$V(XY) = \sin \phi \cos \omega t$$

$$V(XZ + YZ) = \cos \phi \cos \omega t.$$

where cos ωt is the instantaneous amplitude of the excitation voltage. Said voltage combination is obtained by means of a transformer 12 in Scott-arrangement and having a total transformation ratio K so that the following voltages are produced at the terminals of the secondary windings of the transformer:

$$ES1 = K \sin \phi \cos \omega t$$

$$ES2 = K \cos \phi \cos \omega t.$$

An additional function of said transformer consists in making the potentials of the synchro independent of the potentials of the tachometrical system. The demodulators 13 and 14 form the envelopes of the sine and cosine signals, that is to say, the envelopes K sin $\phi$ and K cos $\phi$, respectively, from said voltages.

The sinusoidal output voltage of the demodulator 13 is stored in a storage circuit 17 after a first selection at the instant T by means of a switch 16. In the same manner the cosinusoidal output voltage of the demodulator 14 is sampled at the instant T via a switch 15 and stored in a storage circuit 18. Said switches 15 and 16 are closed only during short time intervals (some microseconds) which are defined by the pulses derived from the clock pulse system 60 which will be described hereafter.

It approximately holds that the first samples of the sine and cosine signals are taken simultaneously at the instant T instead of at the instants T and T+T₁ as explained above.

At the instant T+Te switches 20 and 22 are simultaneously closed so that the output voltage K sin $\phi(T+Te)$ of the demodulator 13 and the output voltage K cos $\phi(T)$ of the storage circuit 18 are simultaneously supplied to the inputs of the respective comparators 23, 24. Each of these comparators 23, 24 has an input which is connected to ground and these comparators are used for determining whether the sine and cosine signals present at the other inputs are positive relative to ground. If the sine signal at input 23 is positive, the output of the comparator selects the sine signal directly by means of switch 27. If the comparator indicates that the cosine signal at the input 23 is negative the signal originating from an inverter 25 is selected by means of a switch 27. If the cosine signal at the input of the comparator 24 is positive, said signal is selected in the same manner by switch 28; if, on the contrary, said cosine signal is negative, the signal is inverted by means of the inverter 26 before it is selected by switch 28.

The various quadrants in which the sine and cosine signals have positive and negative values are shown in FIG. 2. If the shaft of the synchro rotates counter-clockwise, the direction of rotation of said shaft is positive and the signal H·$_B$ (derived from $H_B$), which indicates the rate at which the barometric height changes, is a positive signal, which means that the aircraft ascends. If, on the contrary the shaft of the synchro rotates clock-wise, said direction of rotation is negative and signal H·$_B$ is a negative signal, which means that the aircraft descends. The system offers a solution for all these cases by always indicating the correct sign of H·$_B$.

The output voltages K·sin $\phi(T+Te)$ and K·cos $\phi(T)$ selected by switches 27 and 28, respectively, are input parameters in the respective logarithmetic amplifier circuits 29, 30. The output voltages supplied by these circuits, which are equal to log [K·sin $\phi(T+Te)$] and log [K·cos $\phi(T)$] are supplied to the positive terminals of an adder 31 for forming the sum:

$$\log [K \cdot \sin \phi(T+Te)] + \log [K \cdot \cos \phi(T)].$$

The output voltages of the demodulators 13 and 14 are also squared in squaring circuits 32, 33 for obtaining the products $K^2 \sin^2 \phi(t)$ and $K^2 \cos^2 \phi(t)$, which are thereafter added in an adder circuit 34 for forming the sum $K^2 \cdot [\sin \phi(t) + \cos^2 \phi(t)]$. The output voltage of the adder circuit 34 is supplied to a logarithmic circuit 35 whose output voltage log $[K^2 \cdot \{\sin^2 \phi(t) + \cos^2 \phi(t)\}]$ is supplied to the negative terminal of the adder circuit 31. Thus, the output voltage of this adder circuit 31 is given by the formula:

$$\log [K \cdot \sin \phi(T+Te)] + \log [K \cos \phi(T)] - \log [K^2 \{\sin^2 \phi(t) + \cos^2 \phi(t)\}].$$

This output voltage is supplied to a circuit 36 which forms the anti-logarithm of its input voltage for obtaining the expression:

$$\frac{K^2[\sin^2\phi\ (T\ +\ Te)\cos\phi\ (T)]}{K^2[\sin^2\phi\ (t)\ +\ \cos^2\phi\ (t)]}$$

As mentioned previously this expression is identical to the expression sin $\phi$(T+Te) cos $\phi$(T). Via switch 37 the output voltage 36 is stored in storage circuit 39. Closing the switch 37 is effected during the short period of time (some microseconds) in which the quotient is available at the output of the circuit.

The output voltages of the demodulators 13 and 14 are sampled for the second time at approximately the instant (T+Te). As described previously, sampling the voltage K·sin $\phi$ for the second time is performed at the instant (T+Te) for computing the expression:

$$\sin\phi(T+Te)\cos\phi(T).$$

As soon as the value corresponding to this expression is stored in a storage circuit 39 the switches 20 and 22 are simultaneously opened and the switches 19 and 21 simultaneously closed, in order to supply the output voltages of the storage circuit 17 and of the demodulator 14 to the respective comparators 23, 24.

The voltage K·cos $\phi$ is sampled for the second time at the instant (T+Te)+T$_1$, where T$_1$ is the instant at which the expression cos $\phi$(T+Te) sin $\phi$(T) is formed, T$_1$ being some microseconds. As stated previously, the fact that the value $T_1=(T+T_1)-T$ is small relative to $Te=(T+Te)-T$, the error this produces in the calculation can be neglected, so that it is assumed that the second sampling procedures are performed at the instant (T+Te).

The comparators 23 and 24 examine the signals sin $\phi$(T) and cos $\phi$(T+Te) for selecting the positive values by means of switches 27 and 28. As in the preceding case, the output voltage of the logarithmic circuits 29 and 30 are supplied to the positive terminals of the adder device 31 and the output voltages of the demodulators 13 and 14 are supplied to the negative terminal of the adder device 31 via the squaring circuits 32 and 33, the adder circuit 34 and the logarithmic circuit 35.

So the output of the adder device 31 supplies the expression:

$$\log\ [K\sin\phi(T)]+\log\ [K\cos\phi(T+Te)]-\log\ [K^2\{\sin^2\phi(t)+\cos^2\phi(t)\}].$$

Switch 36 supplies the anti-logarithm of this expression: namely $$\frac{K^2[\sin\phi\ (t)\cos\phi\ (T\ +\ Te)]}{K^2[\sin^2\phi\ (t)\ +\ \cos^2\phi\ (t)]} = \sin\phi\ (T)\cos\phi\ (T\ +\ Te).$$

This second quotient is stored in circuit 40 by means of switch 39 which is closed by a pulse during a time interval of a few microseconds. The quotient thus stored in the circuit 40 is thereafter subtracted from the quotient 1 stored in circuit 39, this subtraction being performed in a subtraction circuit 41 to obtain the expression:

$$\sin(\Delta\phi)-\sin\phi(T+Te)\cos\phi(T)-\sin\phi(T)\cos\phi(T+Te).$$

For small values of $\Delta\phi$, sin $\Delta\phi$ is approximately equal to $\Delta\phi$, this value being the angle which is proportional to the speed of rotation of the synchro. The embodiment shown in FIG. 1 is used in a digital system which furnishes a warning relative to the distance to the ground and which comprises an analog-to-digital converter having a resolution of 11 significant binary digits plus the sign, that is to say the maximum resolution is equal to $\phi=1/2047$.

An aircraft in which the synchro is used for computing the speed at which the barometric height H·$_B$ changes, is usually provided with systems which, in aeronautics, are usually called "KIFIS" of "FINE SYNCHRO," 18000 feet altitude corresponding to one revolution of the shaft of the synchro in the "KIFIS" system, and 5000 feet corresponding to 1 revolution of the shaft of the synchro in the "FINE SYNCHRO" system.

So, for the system "FINE SYNCHRO" the angle $\phi$ corresponds to the change in the barometric height H·$_B$:

$$H_B = \frac{5000\ \text{feet}}{2\ \pi\ \text{radians}} \times \frac{1}{2047} = 0{,}3887\ \text{foot/minute}$$
(maximum resolution).

For the "KIFIS" system the corresponding change in H·$_B$ is:

$$H_B = \frac{18000\ \text{feet}}{2\ \text{radians}} \times \frac{1}{2047} = 1{,}4\ \text{foot/minute}$$
(maximum resolution).

Selecting the scale for the "FINE SYNCHRO" system or for the "KIFIS" system is performed by component 42 which is a scale-selection circuit having an amplifier 43 and calibration resistor 46, 47. Choosing between the "KIFIS" and "FINE SYNCHRO" systems is performed by a selection signal KIF/FS and is effected in the device which furnishes a warning relative to the distance to the ground, in accordance with the specifications of the ARINC 594 standard. When the "FINE SYNCHRO" system is used, the scale factor is determined by the inverter 48 and the resistor 46 which are put into operation by closing switch 44. When the "KIFIS" system is used, resistor 37 is directly made operative by the closing of switch 45 for obtaining the suitable scale factor. The output voltage of the scale selection circuit 42 is H·$_B$ and can immediately be used for the device which supplies an indication relative to the distance to the ground, after an analog-to-digital conversion. When the "KIFIS" system is used a 26 Volts, 400 Hz (VKIF) signal is added, after amplification, in circuit 51 to the selection signal KIF/FS in an AND-gate 50 to produce a validity signal "KIFIS." If the "FINE SYNCHRO" system is used no validity signal is usually produced; however, the signal at the output of the adder circuit 34 is combined in an OR-gate 23 and in an AND-gate 49 with the selection signal FS of the "FINE SYNCHRO" system for obtaining a validity signal "FINE SYNCHRO" at the output. Certain barometric altimeters of the "FINE SYNCHRO" type generate, however, a direct current validity signal "FINE SYNCHRO" (VFS). This signal VFS is applied to the OR-gate 53 simultaneously with the signal deriving from the adder circuit 34 for supplying a validity signal "FINE SYNCHRO" to the AND-gate 49. At the output the two validity signals are transmitted via an OR-gate 52 in the form of a validity signal for the system "KIFIS" (SVKIF) or a validity signal for the system "FINE SYNCHRO" (SVFS) and are directly used for the device which gives an indication relative to the distance to the ground.

The dashed lines show the various switches described with reference to FIG. 1, which are controlled and synchronized by the clock system 60 shown in FIG. 1 by means of a rectangle.

FIG. 3 is a time diagram of the signals for controlling the switches and the synchronization, the signals being supplied by clock system 60.

In FIG. 3 the time axis during the pulse duration of the pulses shown is expressed in microseconds, and the time axis for the pulse intervals is expressed in milliseconds as is shown in the diagrams CL1 to CL5. Diagram CL1 shows a clock signal generated by a monostable circuit which generates a brief pulse. By closing the switches 15 and 16 (FIG. 1) during the pulse duration of pulse 61 the sine and cosine signals are sampled for the first time by the pulse 61, the leading edge of which occurs at instant T. Diagram CL2 shows that a pulse 62 is produced at the instant (T+Te) occurring a time interval $\Delta t$ after the end of pulse 61. The dashed arrows in FIG. 3 show the time relation between the various clock signals. During the duration of pulse 62 the sine signals are sampled for the second time at the instant (T+Te) by closing switch 20 and the first expression sin $\phi$(T+Te) cos $\phi$(T) is formed by closing switch 22 at last-mentioned instant. After a given period of time (approximately some microseconds) after the leading edge of pulse 62 and the calculations of sin $\phi$(T+Te) cos $\phi$(T) has ended, a pulse 63 occurs as shown in diagram CL3. During the duration of pulse 63, which lasts for a few microseconds, the first expression is stored in a store 39 by closing switch 37. Said pulse 63 is generated by a monostable circuit. The trailing edge of pulse 63 causes pulse 62 to end after a short period of time, this pulse 62 starting the pulse 64 shown in diagram CL4. Switch 37 is opened as soon as pulse 63 terminates and switches 20 and 21 are simultaneously opened at the termination of pulse 62. The leading edge of pulse 64 coincides with the instant (T+Te+T$_1$) at which instant the cosine signal is sampled for the second time by the closing of switch 21. During the duration of pulse 64, which lasts for a few microseconds, switch 19 is closed, simultaneously with switch 21, as described for pulse 62, the second expression sin $\phi$(T) cos $\phi$(T+Te+T$_1$) is computed. This expression corresponds approximately with the expression sin $\phi$(T) cos $\phi$(T+Te) as previously described. After a short delay the leading edge of pulse 64 produces pulse 65, which is shown in time diagram CL5, the second expression being computed during this time delay. Pulse 65 which is comparable to pulse 63 is used for storing the second expression in storage circuit 40 by the closing of switch 38. The trailing edge of pulse 65 causes pulse 64 to be terminated. Switch 38 is opened as soon as pulse 65 terminates and switches 19 and 21 are simultaneously opened as soon as pulse 64 terminates.

The pulse shown in the diagrams CL1, CL3 and CL5 can be derived by means of controlled monostable circuits, while the pulses shown in the diagrams CL2 and CL4 can be obtained by means of bistable circuits. Pulse 61 may either function independently or coincide with the clock pulses of a device which gives an indication of the distance to the ground. If, in the latter case, said warning device receives each second 30 sampling values about the height H$_B$, the period between the consecutive pulses 61 is to approximately 33 microseconds. The period of time T$_e$ is approximately 15 milliseconds and the period of time T$_1$ a few microseconds. The output voltage of the signal H·$_B$ remains constant from the trailing edge of pulse 64 to the leading edge of pulse 62 in the next cycle, which occupies approximately 33 milliseconds. The variations in the voltage H·$_B$ during the sampling procedure may consequently be neglected and the received values can be assimilated from the instantaneous values of the samples.

If so desired, the period of time Te can be easily changed to obtained a higher precision; this also applies to the pulse repetition period of pulse 61 if higher sampling rates are required. The resolutions of 1.4 foot per minute for the "KIFIS" system and 0.3887 foot per minute for the "FINE SYNCHRO" system are no limitations particular to the described embodiment with respect to the speed of rotation of the synchro, but are the result of the analog-to-digital converter used in this embodiment; the use of analog-to-digital converters of a higher precision will increase the resolution of the system, if so required. All switches are electronic switches and, preferably, field effect transistors.

It should be noted that the described system only represents a special embodiment of the invention. The sine and cosine signals which are sampled a first and a second time, said sampling operations being performed at the instants T, (T+T$_1$), (T+Te) and (T+Te+T$_1$) in which Te>>T$_1$ could be directly applied to the input of a device, which furnishes an indication of the distance to the ground, via an analog-to-digital converter operating in synchronism with the sampling period. A micro-processor implemented device for indicating the distance to the ground could perform all computations required in accordance with a given program in the same order as described for the embodiment shown in the drawing for producing the required signal H·$_B$.

Inversely, it would be possible to implement a digital embodiment using the same principles as those described for the system shown in FIG. 1. In such an embodiment the sine and cosine signals can be sampled as described with reference to FIG. 1, while all arithmetic units can be replaced by an arithmetic logic unit in which a micro-programmable logic network is used for performing the multiplications, divisions, additions and subtractions required in the sequence already described. The storage circuits can be replaced by registers. A further condition is the separate, non-recurrent computation and storage of the expression:

$$K^2[\sin^2 \phi(t) + \cos^2 \phi(t)]$$

in order to use this expression with each expanded product. This output voltage H·$_B$ can be directly sampled by the device which gives an indication about the distance to the ground.

What is claimed is:

1. A system for generating a signal which is representative of the speed of rotation of a synchro using a first digital signal which is proportional to the sine of the angle of rotation of the shaft of the synchro and a second digital signal which is proportional to the cosine of said angle, comprising:
   means for a first sampling of said sine signal;
   means for a first sampling of said cosine signal;
   means for a second sampling of said sine signal after a predetermined period of time has elapsed after said first sampling of the sine signal;
   means for a second sampling of said cosine signal after a predetermined period of time has elapsed after said first sampling operation of the cosine signal;

means for multiplying said second sampled sine signal by said first sampled cosine signal for forming a first product;

means for multiplying said first sample sine signal by said second sample cosine signal for forming a second product;

means for squaring said sine and cosine signals;

means for adding said squared sine and cosine signals for forming a first sum;

means for dividing said first product by said first sum for forming first quotient;

means for dividing said second product by said first sum for forming a second quotient; and means for subtracting said second quotient from said first quotient for producing a signal which is representative of the speed of rotation of the said synchro.

2. A system as claimed in claim 1, further comprising:

means for electrically insulating said sine and cosine signals relative to the output voltage of said synchro.

3. A system as claimed in claim 2, further comprising:

means for demodulating said sine and cosine signals, said means comprising:

a modulated reference voltage;

first and second switching means for sampling said sine and cosine signals for the first time;

first and second storage elements for storing said first sampled sine and cosine signals;

third and fourth switching means for sampling said sine and cosine signals for a second time after a predetermined time interval following said first sampling operations;

a multiplying means;

a fifth switching means for simultaneously applying said first sampled and second sampled cosine and sine signals to said multiplying means for forming a first product;

means for squaring said first sampled and second sampled sine and cosine signals;

means for adding said squared signals for forming a first sum;

a dividing means;

means for applying said first product and said first sum to dividing means for obtaining a first quotient;

a sixth switching means for sampling said first quotient;

a third storage element for storing said sampled first quotient;

a seventh switching means for simultaneously applying said first sampled sine signals and said second sampled cosine signals to said multiplying means for forming a second product;

means for applying said second product and said first sum to said devising means for forming a second quotient;

an eighth switching means for sampling said second quotient;

a fourth storage element for storing said second sampled quotient; and, subtracting means for subtracting said second quotient from said first quotient for forming a signal which is representative of the speed of rotation of the synchro.

4. A system as claimed in claim 3, further comprising:

ninth and tenth switching means for selecting a scale for said signal which is representative of the speed of rotation of the synchro.

5. A system as claimed in claim 4, further comprising:

comparators for determining the polarity of said first sampled and second sampled sine and cosine signals.

6. A system as claimed in claim 5, further comprising:

eleventh and twelfth switching means for selecting the positive values of said first sampled and second sampled sine and cosine signals.

7. A system as claimed in claim 5, further comprising:

a clock pulse system for generating clock pulses for controlling and synchronizing said switching means.

8. A system as claimed in claim 7, further comprising:

means for generating a first pulse signal of a given time duration for controlling said first and second switching means;

means for generating a second pulse signal after a given time interval has elapsed after said first clock signal for controlling said third and fifth switching means;

means for generating a third pulse signal of a given time duration after elapsing of a time interval after the leading edge of the second pulse signal for controlling said sixth switching means;

means for generating a fourth pulse signal after said second pulse signal has ended for controlling said fourth and seventh switching means; and means for generating a fifth pulse signal after elapsing of a given time interval after said fourth pulse signal for controlling said eighth switching means.

9. A system as claimed in claim 2, wherein:

said signal which is representative of the speed of rotation of the synchro represents the speed in which the barometric height $H_B$ varies, proportional to the angle of rotation of the shaft of the synchro.

* * * * *